US008190755B1

(12) United States Patent
Satish et al.

(10) Patent No.: US 8,190,755 B1
(45) Date of Patent: May 29, 2012

(54) METHOD AND APPARATUS FOR HOST AUTHENTICATION IN A NETWORK IMPLEMENTING NETWORK ACCESS CONTROL

(75) Inventors: Sourabh Satish, Fremont, CA (US); Brian Hernacki, San Carlos, CA (US); Shane Pereira, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 726 days.

(21) Appl. No.: 11/645,958

(22) Filed: Dec. 27, 2006

(51) Int. Cl.
*G06F 15/16* (2006.01)
(52) U.S. Cl. ........................................ 709/229; 709/225
(58) Field of Classification Search .................. 709/225, 709/229
See application file for complete search history.

(56) References Cited

U.S. PATENT DOCUMENTS

| 6,792,474 | B1 * | 9/2004 | Hopprich et al. ............. 709/245 |
| 7,134,012 | B2 * | 11/2006 | Doyle et al. .................. 713/151 |
| 7,320,143 | B2 * | 1/2008 | Le Pennec et al. ............. 726/30 |
| 7,765,584 | B2 * | 7/2010 | Roskind ............................ 726/5 |
| 2003/0217289 | A1 * | 11/2003 | Ammon et al. ................ 713/201 |
| 2006/0114863 | A1 * | 6/2006 | Sanzgiri et al. ............... 370/338 |
| 2007/0162959 | A1 * | 7/2007 | Yang .................................. 726/4 |
| 2007/0204048 | A1 * | 8/2007 | Zhang ........................... 709/227 |
| 2008/0140795 | A1 * | 6/2008 | He et al. ........................ 709/207 |

* cited by examiner

*Primary Examiner* — Brian P Whipple
(74) *Attorney, Agent, or Firm* — Wilmer Cutler Pickering Hale and Dorr LLP

(57) ABSTRACT

Method and apparatus for host authentication in a network implementing network access control is described. In an example, a network access control (NAC) server receives network address requests from hosts on a network. If a host is compliant with an established security policy, the NAC server determines a unique indicium for the host and records the unique indicium along with a network address leased to the host by a dynamic host configuration protocol (DHCP) server. When a host requests access to a resource on the network, the host is authenticated by determining whether its asserted network address is valid. If valid, a pre-computed unique indicium for that address is obtained and compared with a unique indicium for the host. If the indicia match, the host is allowed access to the resource. Otherwise, the host is blocked from access to the resource.

18 Claims, 7 Drawing Sheets

500

METHOD AND APPARATUS FOR HOST AUTHENTICATION IN A NETWORK IMPLEMENTING NETWORK ACCESS CONTROL

BACKGROUND OF THE INVENTION

1. Field of the Invention

Embodiments of the invention generally relate to networks and, more specifically, to a method and apparatus for host authentication in a network implementing network access control.

2. Description of the Related Art

Presently, network operators face the threat of their managed systems being compromised by misuse, misconfiguration, and malicious access. Network Access Control (NAC) is a process designed to reduce security incidents and increase compliance by enforcing security policies as a prerequisite for access to managed networks. While there several approaches to NAC, dynamic host configuration protocol (DHCP)-based NAC is becoming more popular. DHCP-based NAC is easier to integrate into the network than other NAC technologies and does not have any extra hardware requirements.

In DHCP-based NAC, a NAC component is integrated with a DHCP server. A device accesses the network and sends a DHCP request for internet protocol (IP) address assignment. The device typically includes an agent that serves as a policy decision point. When a device requests an IP address, the DCHP server queries the agent on the device to ensure compliance with established security policies. If the device complies with the security policies, the DHCP server assigns the device an IP address, giving it access to the appropriate network. If the device does not comply with the security policies, the device may be blocked from the network or kept in quarantine (e.g., assigned to a special virtual local area network (VLAN)).

There are some drawbacks to the conventional DHCP-based NAC described above. Notably, a rogue device may evade DHCP-based NAC by accessing the network and assuming a static IP address. Devices with static IP addresses do not interact with the DHCP server. Alternatively, a rogue device may assume the IP address of an authentic device that was leased an IP address from the DHCP server. In either case, the rogue device can connect to the network without satisfying the established security policies. Such a rogue device can exploit network resources or otherwise deleteriously affect network security. Accordingly, there exists a need in the art for authentication of devices in a network implementing NAC.

SUMMARY OF THE INVENTION

An aspect of the invention relates to a method, apparatus, and computer readable medium for authenticating a host requesting access to a resource managed by a network access control (NAC) server on a network. A network address asserted by the host is identified. A determination is made whether the network address is valid. If the network address is valid: a unique indicium corresponding to the host is determined. A pre-computed indicium for the network address is obtained. The unique indicium is compared with the pre-computed indicium. An instruction to block traffic at the resource from the host is generated if the unique indicium does not match the pre-computed indicium. An instruction to allow traffic at the resource from the host is generated if the unique indicium matches the pre-computed indicium.

Another aspect of the invention relates to a system for authenticating a host requesting access to a resource on a network. The system includes a network security agent and a network access control (NAC) server. The network security agent is configured to send an authentication request having a network address asserted by the host. The NAC server is configured to determine whether the network address is valid and, if the network address is valid: determine a unique indicium for the network address, obtain a pre-computed indicium for the network address, compare the unique indicium and the pre-computed indicium, and generate an instruction to block traffic at the resource from the host if the unique indicium does not match the pre-computed indicium or allow traffic at the resource from the host if the unique indicium matches the pre-computed indicium.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
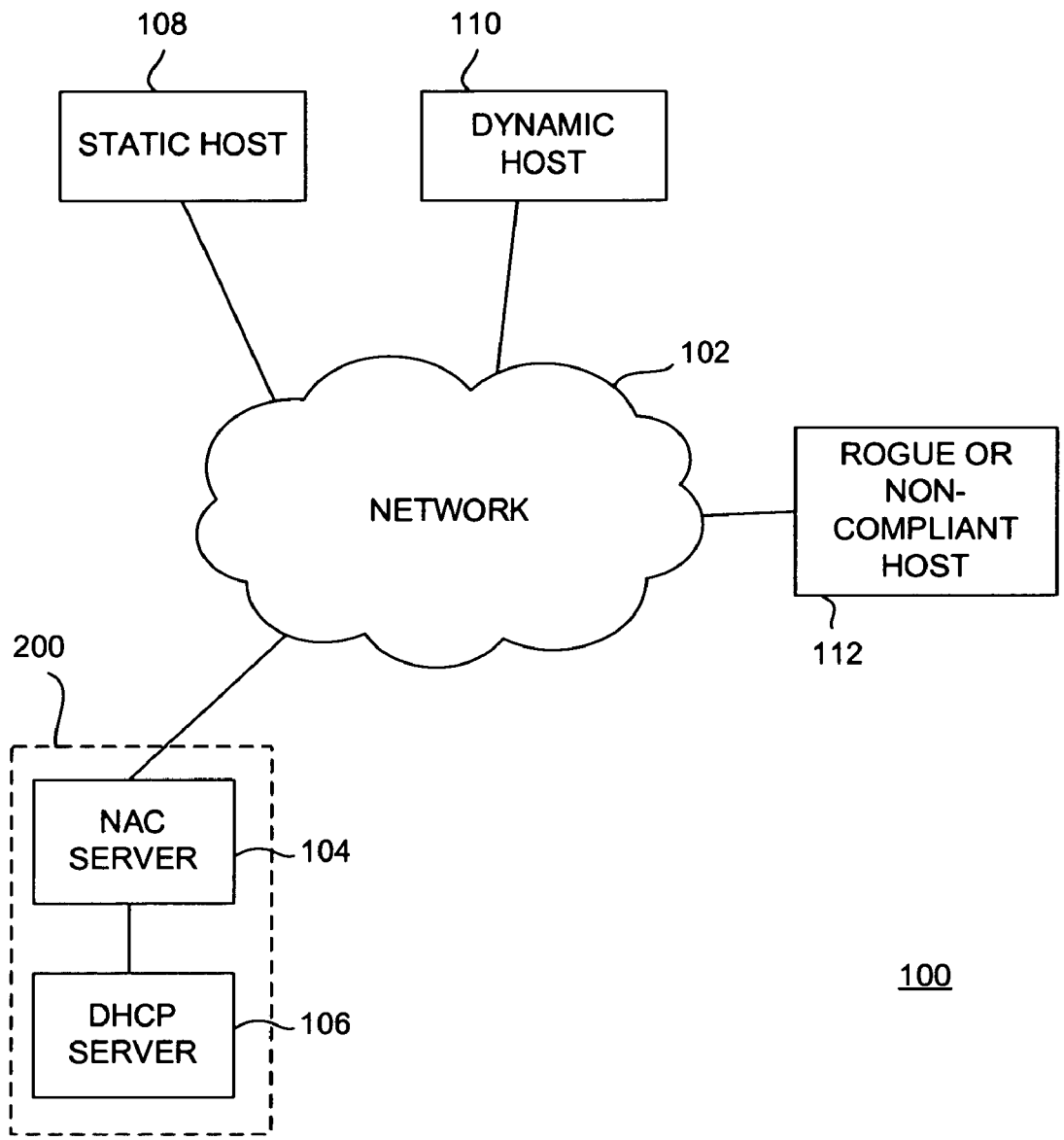
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The system 100 includes a network 102, a network access control (NAC) server 104, a dynamic host configuration protocol (DHCP) server 106, static hosts 108, and dynamic hosts 110. Each of the static hosts 108 and the dynamic hosts 110 are coupled to the network 102. The term "host" is meant to encompass any type of computer system coupled to the network 102, including client computers and server computers. The DHCP server 106 is coupled to the NAC server 104, which in turn is coupled to the network 102. The DHCP server 106 and the NAC server 104 are logical elements that may be implemented using the same computer system or separate computer systems. The network 102 comprises a communication system that connects computer systems by wire, cable, fiber optic, and/or wireless links facilitated by various types of well-known network elements, such as hubs, switches, routers, and the like. The network 102 may employ various well-known protocols to communication information. For example, the network 102 may comprise an Ethernet local area network (LAN) configured communicate at the network layer using Internet Protocol (IP).

Each of the static hosts 108 is assigned a static network address (e.g., static IP address). That is, the static hosts 108 are configured with "fixed" network addresses that do not change over time without explicit re-configuration. Exemplary static hosts 108 include Intranet Sites/Portals, printers, gateways, and the like. Each of the dynamic hosts 110 is dynamically assigned a network address by the DHCP server 106. That is, the dynamic hosts 110 obtain their network addresses using DHCP. As is well known in the art, DHCP is a protocol used by hosts (clients) to request and obtain network addresses and other information from a DHCP server, which has a list of network address allowable for assignment. Other information dynamically assigned by the DHCP server 106 includes default router(s), subnet mask, domain name system (DNS) server address(es), and the like. The network addresses and other parameters assigned by DHCP server 106 may be set to expire, causing the dynamic hosts 110 to periodically refresh such information. The length of time the address and other information is available to a dynamic host is called a lease. Hence, it can be said that the dynamic hosts 110 lease network addresses from the DHCP server 106. Operation of the DHCP protocol is well known in the art.

Figure 2:
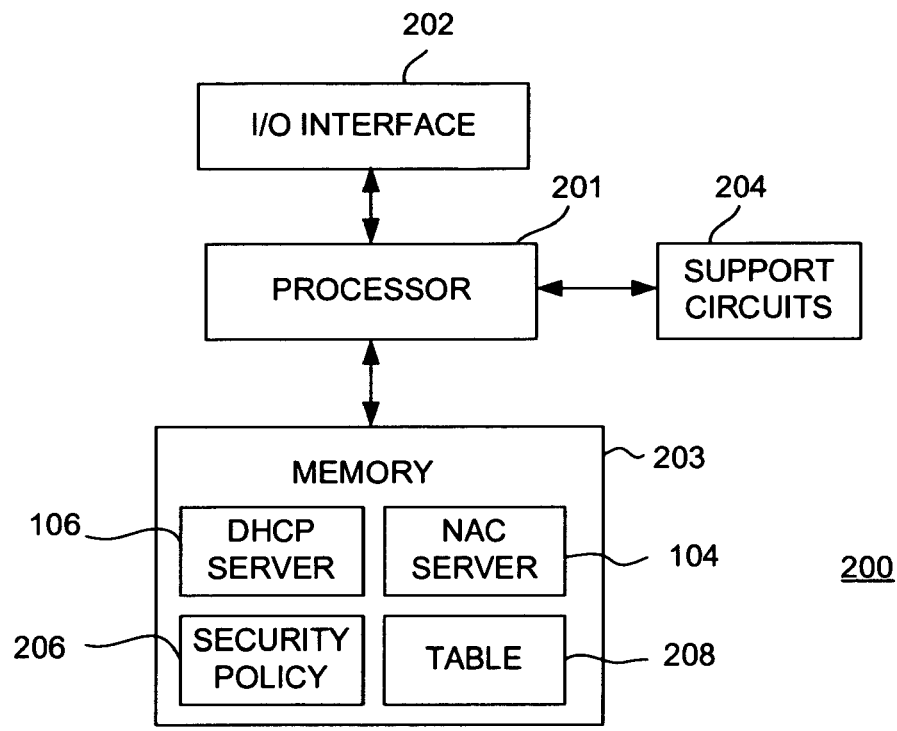
FIG. 2 is a block diagram depicting an exemplary embodiment of an appliance for implementing a NAC server and a DHCP server in accordance with one or more aspects of the invention.

The NAC server 104 is deployed between the network 102 and the DHCP server 106 to implement DHCP-based NAC. FIG. 2 is a block diagram depicting an exemplary embodiment of an appliance 200 for implementing the NAC server 104 and the DHCP server 106 in accordance with one or more aspects of the invention. The appliance 200 includes a processor 201, a memory 203, various support circuits 204, and an I/O interface 202. The processor 201 may include one or more microprocessors known in the art. The support circuits 204 for the processor 201 include conventional cache, power supplies, clock circuits, data registers, I/O interfaces, and the like. The I/O interface 202 may be directly coupled to the memory 203 or coupled through the processor 201. The I/O interface 202 is configured for communication with the network 102.

The memory 203 stores processor-executable instructions and/or data that may be executed by and/or used by the processor 201. These processor-executable instructions may comprise hardware, firmware, software, and the like, or some combination thereof. Modules having processor-executable instructions that are stored in the memory 203 include NAC server 104 and DHCP server 106. The memory 203 may include one or more of the following random access memory, read only memory, magneto-resistive read/write memory, optical read/write memory, cache memory, magnetic read/write memory, and the like, as well as signal-bearing media as described below. The appliance 200 is merely exemplary. The DCHP server 106 and the NAC server 104 may be implemented using separate appliances each similar to the appliance 200. In addition, for purposes of clarity by example, the DHCP server 106 and the NAC server 104 are shown as separate modules in the appliance 200. It is to be understood that the functionality of the DHCP server 106 and the NAC server 104 may be implemented using a single module (e.g., a DHCP/NAC server).

Referring to FIGS. 1 and 2, the NAC server 104 is configured with a definition of a security policy 206. The security policy 206, typically established by a network administrator, provides device configuration requirements that the administrator wishes to enforce as a prerequisite for network access. The security policy 206 may include any system or third-party software configurations. For example, the security policy 206 may include verification that operating system security patches are up-to-date, verification that antivirus software is running and signature definitions are up-to-date, verification that endpoint firewall software is running and properly configured, and the like. The security policy 206 may also force a host to do a malware (malicious software) scan to verify that there is no malware on the system.

Figure 3:
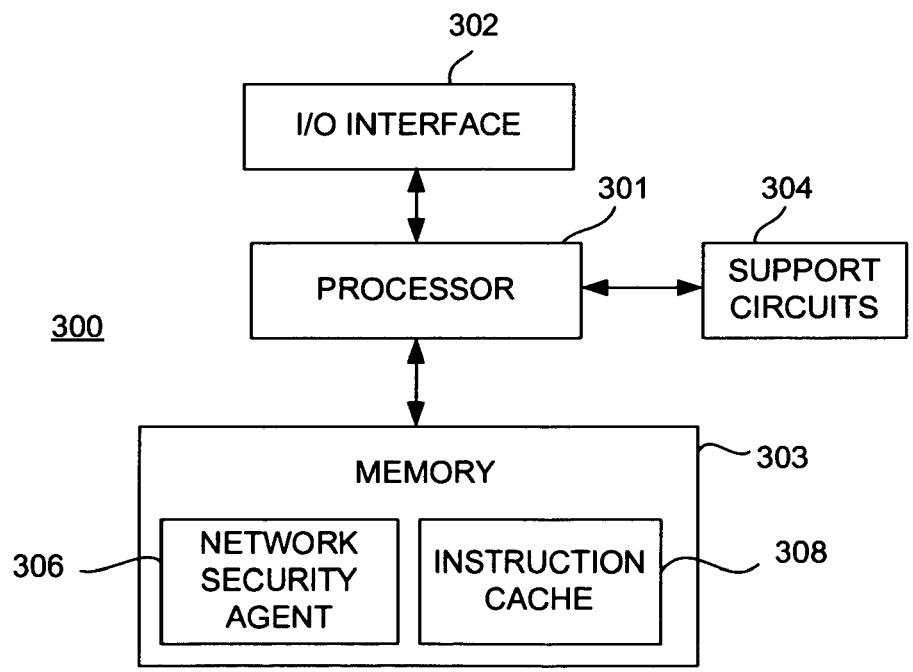
FIG. 3 is a block diagram depicting an exemplary embodiment of a host in accordance with one or more aspects of the invention.

When a dynamic host requests a network address from the DHCP server 106, the NAC server 104 tests the host to determine compliance with the established security policy. Each of the hosts 108 and 110 includes a network security agent. FIG. 3 is a block diagram depicting an exemplary embodiment of a host 300 in accordance with one or more aspects of the invention. The host 300 may be a dynamic host 110 or a static host 108. The host 300 includes a processor 301, a memory 303, various support circuits 304, and an I/O interface 302. The processor 301 may include one or more microprocessors known in the art. The support circuits 304 for the processor 301 include conventional cache, power supplies, clock circuits, data registers, I/O interfaces, and the like. The I/O interface 302 may be directly coupled to the memory 303 or coupled through the processor 301. The I/O interface 302 is configured for communication with the network 102, as well as other types of input and output devices (e.g., mouse, keyboard, display, etc).

The memory 303 stores processor-executable instructions and/or data that may be executed by and/or used by the processor 301. These processor-executable instructions may comprise hardware, firmware, software, and the like, or some combination thereof. Modules having processor-executable instructions that are stored in the memory 303 include network security agent 306. The host 300 may be programmed with an operating system 350, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

Referring to FIGS. 1-3, one function of the network security agent 306 is to serve as a policy decision point. The NAC server 104 queries the network security agent 306 of the requesting host to determine whether the host is compliant with the security policy. If the host is compliant with the security policy, the NAC server 104 passes the request to the DHCP server 106, which assigns the host a network address. That is, the NAC server 104 grants the host access to the network 102 by allowing the host to obtain a network address. If the requesting host does not have a network security agent or a non-compliant network security agent (i.e., the host is not compliant with the security policy), the NAC server 104 can block the request for a network address. Without a network address, the host cannot communicate over the network 102 and is effectively blocked from the network 102. Alternatively, the NAC server 104 can quarantine the non-compliant host. For example, a virtual LAN (VLAN) may be established as a quarantine network. The NAC server 104 may be configured to assign, or instruct the DHCP server 106 to assign, a network address associated with the quarantine VLAN.

In one aspect of the invention, before the NAC server 104 allows the DHCP server 106 to grant a network address to the requesting dynamic host, the NAC server 104 computes an indicium uniquely associated with the requesting dynamic host ("host fingerprint"). A host fingerprint includes a data item or a combination of data items associated with the requesting host or a representation of such data (e.g., a hash or encryption of such data). Such unique data may include, for example, a media access control (MAC) address associated with the requesting host (e.g., a unique address assigned to a network interface card (NIC) in the I/O interface 302). Other types of data may be used as an alternative to or in addition to the MAC address, including operating system version, operating system serial number, serial numbers/versions of other types of software, and the like. In one embodiment, the NAC server 106 obtains the data to form a host fingerprint from the network address request of the host. For example, the NAC server 106 may obtain the MAC address for the requesting host from its request for a network address. Alternatively, the NAC server 106 may query the network security agent 306 in the requesting host to obtain additional data for the host fingerprint.

When the DHCP server 106 assigns a network address to the requesting host, the NAC server 104 records the network address and corresponding host fingerprint in a table 208. In this manner, the NAC server 104 maintains a table 208 of leased network addresses and the fingerprints of the hosts that have been assigned such addresses. The NAC server 104 is also configured with a range of valid static network addresses associated with the static hosts 108, which are also recorded in the table 208. The NAC server 104 also determines a host fingerprint for each of the static resources 108, which is associated with the corresponding static network address in the table 208. For example, given the static network addresses, the NAC server 104 may obtain data for the host fingerprints from the network security agents 306 of the static resources 108. In this manner, the NAC server 104 manages the static hosts 108 and the dynamic hosts 110 on the network 102.

Assume a rogue or otherwise non-compliant host, such as host 112, attempts to access the network 102 and bypass NAC enforcement. For example, the host 112 may assume a static network address in an attempt to bypass NAC enforcement. Alternatively, the host 112 may observe network traffic and assume a network address of one of the dynamic hosts 110 that was leased a network address by the DHCP server 106. As described below, NAC enforcement provided by the NAC server 104 will prevent the host 112 from accessing any of the managed hosts on the network 102.

In particular, when the host 112 requests access to one of the static hosts 108 or dynamic hosts 110 (referred to below as the "resource"), the resource identifies the network address asserted by the host 112. In an embodiment, the resource sends an authentication request to the NAC server 104 that includes the asserted network address of the host 112. The NAC server 104 first determines if the network address asserted by the host 112 is valid. For example, the NAC server 104 may query the table 208 with the asserted network address. If the network address is not in the table 208, than the network address is designated as being invalid (i.e., the network address was not leased and is not a static network address). If the NAC server 104 identifies an invalid network address, the NAC server 104 sends an instruction to the resource to block traffic from the host 112. If the network address is in the table 208, then the network address is designated as being valid.

Next, the NAC server 104 determines a fingerprint of the host 112 (i.e., unique indicium). The NAC server 104 may determine the fingerprint as described above. The NAC server 104 determines if the fingerprint of the host 112 matches the fingerprint in the table 208 for the asserted network address ("pre-computed fingerprint"). The NAC server 104 may query the table 208 with the asserted network address to obtain the pre-computed fingerprint for that network address. If the fingerprint of the host 112 matches the pre-computed fingerprint for the asserted network address, the NAC server 104 sends an instruction to the resource to allow traffic from the host 112. If the fingerprint of the host 112 does not match the pre-computed fingerprint for that network address, the NAC server 104 sends an instruction to the resource to block traffic from the host 112. In the present example, the rogue or non-compliant host 112 includes a valid network address, but is blocked from communicating with the resource, since its fingerprint will differ from the pre-computed fingerprint associated with the asserted network address.

In an embodiment, the table 208 also includes a list of static network addresses that can never attempt communication with a resource ("flagged static network addresses"). If the NAC server 104 identifies the asserted network address as being one of the flagged static network addresses, the NAC server 104 designates the network address as being invalid and instructs the resource to block traffic from the host.

In another embodiment, all or a portion of the table 208 is replicated from the NAC server 104 to the hosts 108 and 110. For example, in an embodiment, the network security agent 306 of the resource may obtain the list of flagged static network addresses from the NAC server 104. In such case, the resource need not send an authentication request to the NAC server 104 if the asserted network address is in the list of flagged static network addresses. The resource can query the list of flagged static network addresses first and block traffic from the host if the host is asserting one of the flagged static network addresses. In another embodiment, the network security agent 306 may obtain a replica of the entire table 208 from the NAC server 104, which may be periodically refreshed via configuration updates. In such case, the resource need not send authentication requests to the NAC server 104 for any asserted network address or only for network addresses that are not included in the replicated version of the table 208. Rather, the network security agent 306 of the resource performs the above-described process to authenticate the requesting host.

In an embodiment, the resource may cache the instruction received from the NAC server 104 or generated by the network security agent 306 of the resource for a particular asserted network address from a host. That is, each of the hosts 108 and 110 may maintain a cache of instructions for various asserted network addresses (e.g., an instruction cache 308). For each asserted network address, the network security agent 306 queries the instruction cache 308 to identify if an instruction already exists for the network address. If so, the network security agent 306 blocks or allows traffic according to the instruction. Otherwise, the network security agent 306 sends an authentication request to the NAC server 104 or handles the authentication itself, as described above. In this manner, if another host asserting the same network address or the same host attempts communication, the resource does not have to communicate with the NAC server 104 or otherwise execute the entire authentication process. The network security agent 306 may cache the instructions for varying durations. For example, if the asserted network address is a DHCP leased address, the instructions can be cached for a longer durations during work hours/days and for shorter durations during non-working hours/days.

Figure 4:
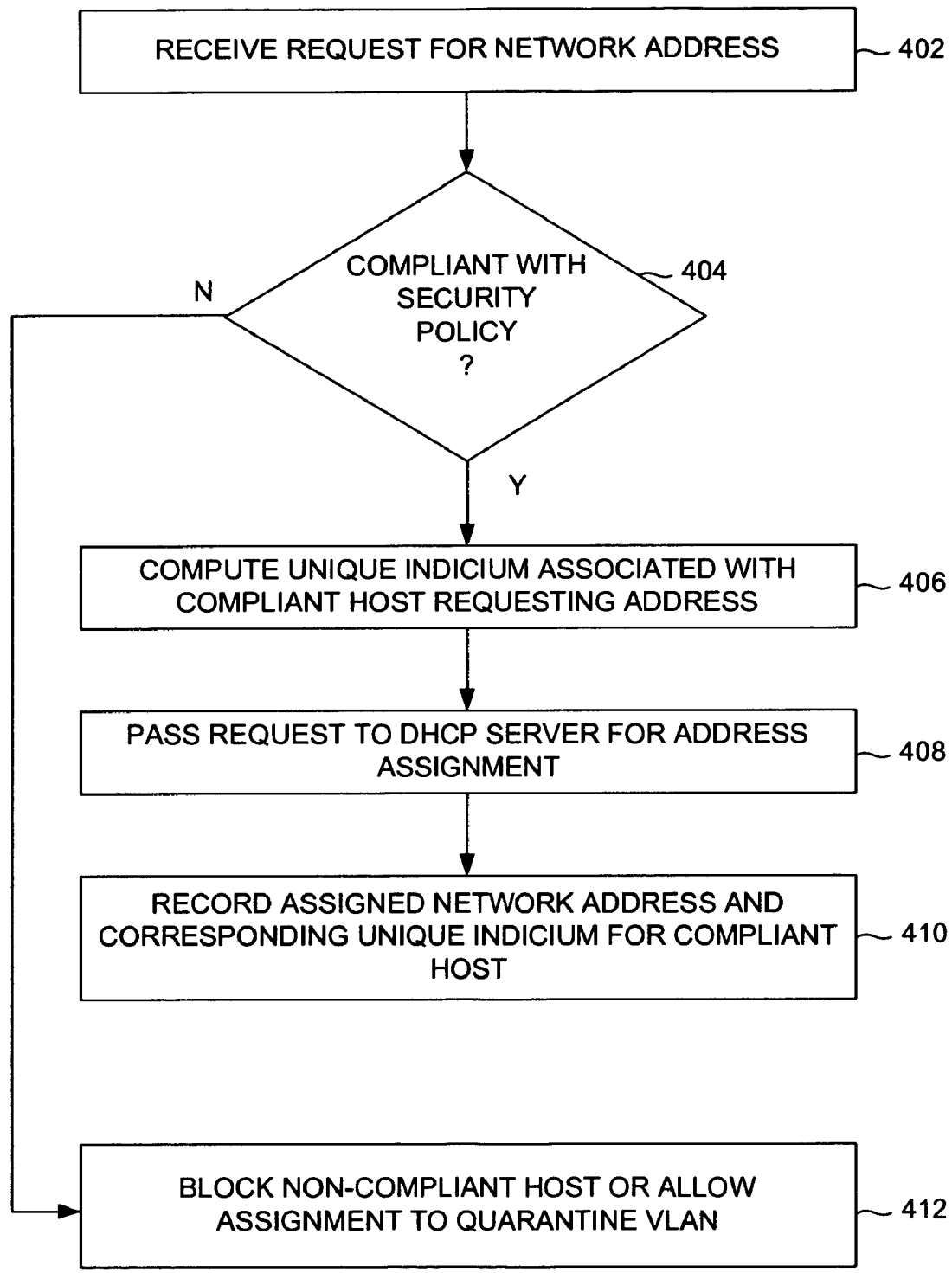
FIG. 4 is a flow diagram depicting an exemplary embodiment of a method for assigning a network address to a host in accordance with one or more aspects of the invention.

FIG. 4 is a flow diagram depicting an exemplary embodiment of a method 400 for assigning a network address to a host in accordance with one or more aspects of the invention. The method 400 may be performed by the NAC server 104. The method 400 begins at step 402, where a request for a network address is received. At step 404, a determination is made whether the host is compliant with the security policy. If not, the method 400 proceeds to step 412, where the non-compliant host is blocked from network access or is allowed access to a quarantine network. If at step 404 the host is compliant with the security policy, the method 400 proceeds to step 406, where a unique indicium associated with the compliant host is computed (i.e., host fingerprint). At step 408, the address request is passed to the DHCP server 106 for address assignment. At step 410, the assigned network address and the corresponding unique indicium is recorded for the compliant host.

Figure 5:
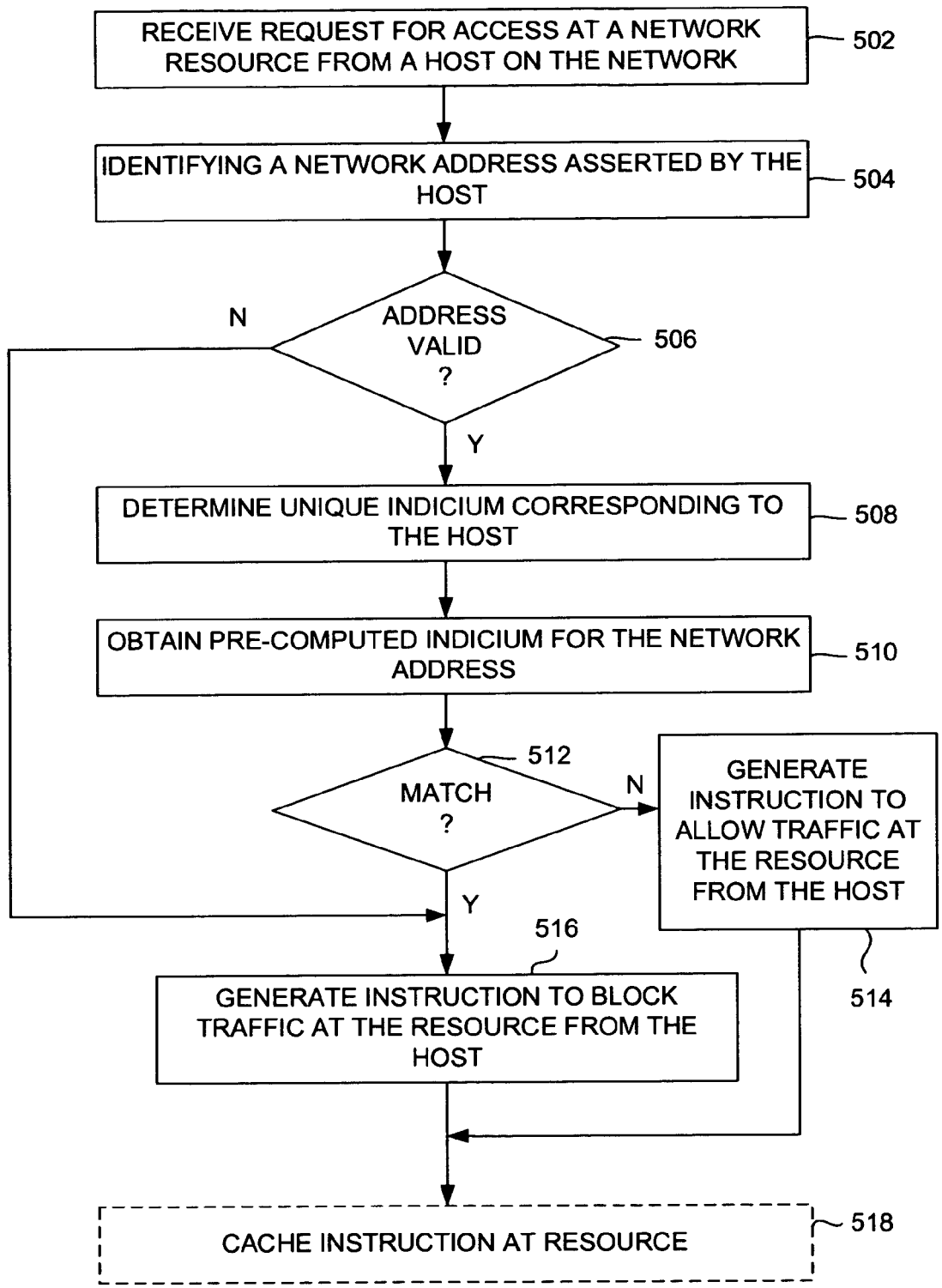
FIG. 5 is a flow diagram depicting an exemplary embodiment of a method for authenticating a host at a managed network resource in accordance with one or more aspects of the invention.

FIG. 5 is a flow diagram depicting an exemplary embodiment of a method 500 for authenticating a host at a managed network resource in accordance with one or more aspects of the invention. The method 500 begins at step 502, where a request for access by the host is received at the resource. At step 504, a network address asserted by the host is identified. At step 506, a determination is made whether the asserted address is valid. If so, the method 500 proceeds to step 508; otherwise, the method 500 proceeds to step 516. At step 508, a unique indicium corresponding to the host is determined. At step 510, a pre-computed indicium for the network address is obtained.

At step 512, a determination is made whether the unique indicium of the host matches the pre-computed unique indicium for the asserted network address. If not, the method 500 proceeds to step 516; otherwise, the method 500 proceeds to step 514. At step 514, an instruction to allow traffic at the resource form the host is generated. At step 516, an instruction to block traffic at the resource from the host is generated. From steps 514 and 516, the method 500 may proceed to optional step 518, where the instruction is cached at the resource. Notably, the method 500 may be performed by a single appliance or device (e.g., the NAC server 104 or a resource on the network). Alternatively, some steps may be performed by one appliance or device, while other steps may be performed by a different appliance or device.

Figure 6:
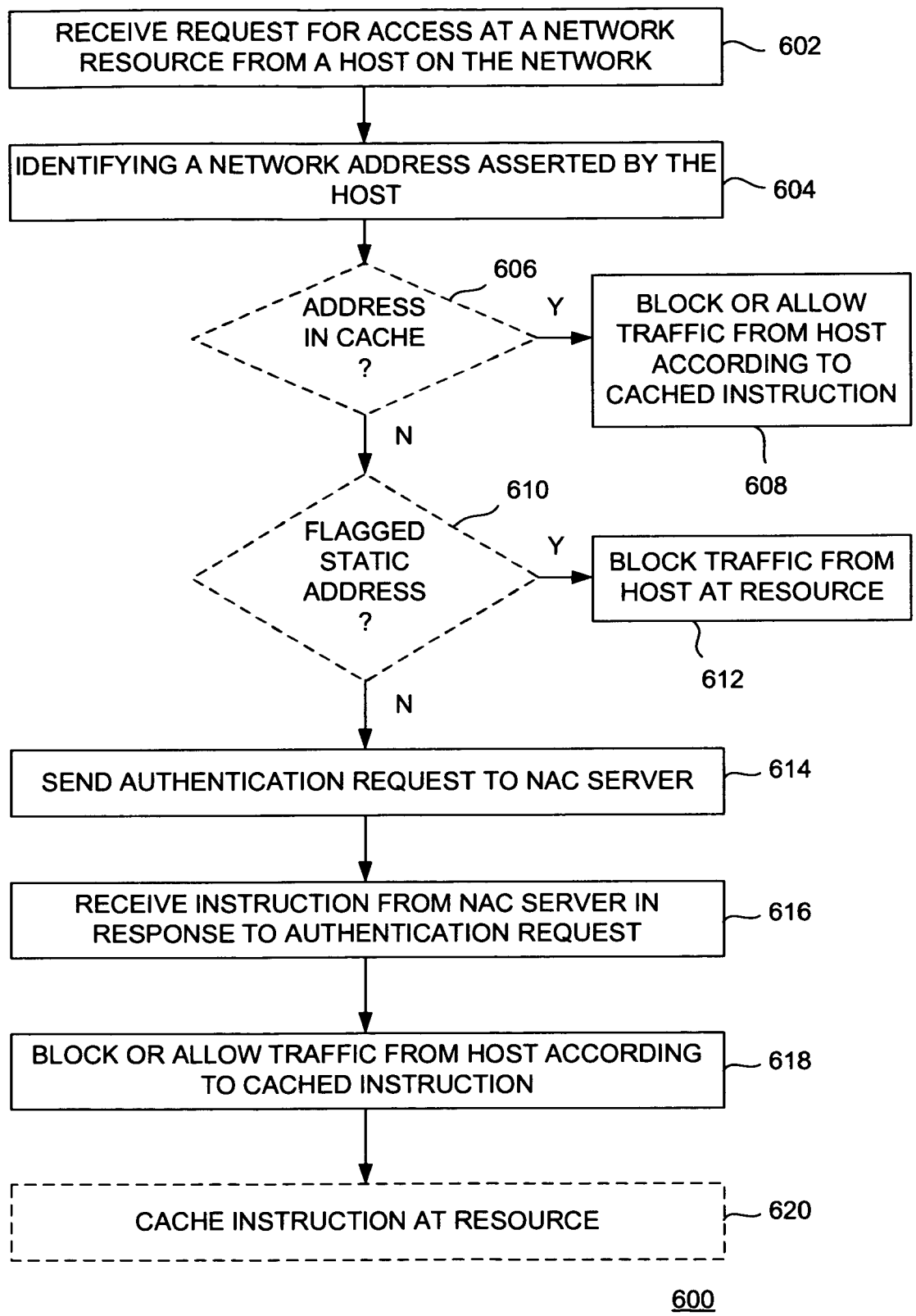
FIG. 6 is a flow diagram depicting another exemplary embodiment of a method for authenticating a host at a managed network resource in accordance with one or more aspects of the invention.

FIG. 6 is a flow diagram depicting another exemplary embodiment of a method 600 for authenticating a host at a managed network resource in accordance with one or more aspects of the invention. The method 600 may be performed by one of the hosts 108 or 110 (i.e., the resource being accessed by a host). The method 600 begins at step 602, where a request for access by the host is received at the resource. At step 604, a network address asserted by the host is identified. At step 614, an authentication request is sent to the NAC server 104. At step 616, an instruction is received from the NAC server 104 in response to the authentication request. The instruction may be generated at the NAC server 104 in accordance with steps 506 through 516 of the method 500 in FIG. 5. At step 618, traffic from the host is blocked or allowed at the resource according to the instruction received from the NAC server 104. At optional step 620, the instruction may be cached at the resource.

In another embodiment, at optional step 606, a determination may be made whether the asserted network address is in an instruction cache of the resource. As described above, a resource may maintain a cache of instructions associated with particular network addresses. If the asserted network address is in the instruction cache, the method 600 proceeds to step 608, where traffic is blocked or allowed according to the cached instruction. Accordingly, the resource does not send an authentication request to the NAC server 104. If at optional step 606 the asserted network address is not in the instruction cache, the method 600 proceeds to step 614.

Alternatively, in yet another embodiment, the method 600 may proceed from optional step 606 to optional step 610, where a determination may be made whether the asserted network address is a flagged static address. As described above, a resource may be configured with a list of flagged static network addresses that can never attempt communication. If the asserted network address is not in such a list, the method 600 proceeds to step 614. Otherwise, the method 600 proceeds to step 612, where traffic from the host is blocked at the resource. Accordingly, the resource does not send an authentication request to the NAC server 104. In yet another embodiment, the method 600 may proceed from step 604 directly to optional step 610, bypassing steps 606 and 608 (i.e., no instruction cache is maintained).

Figure 7:
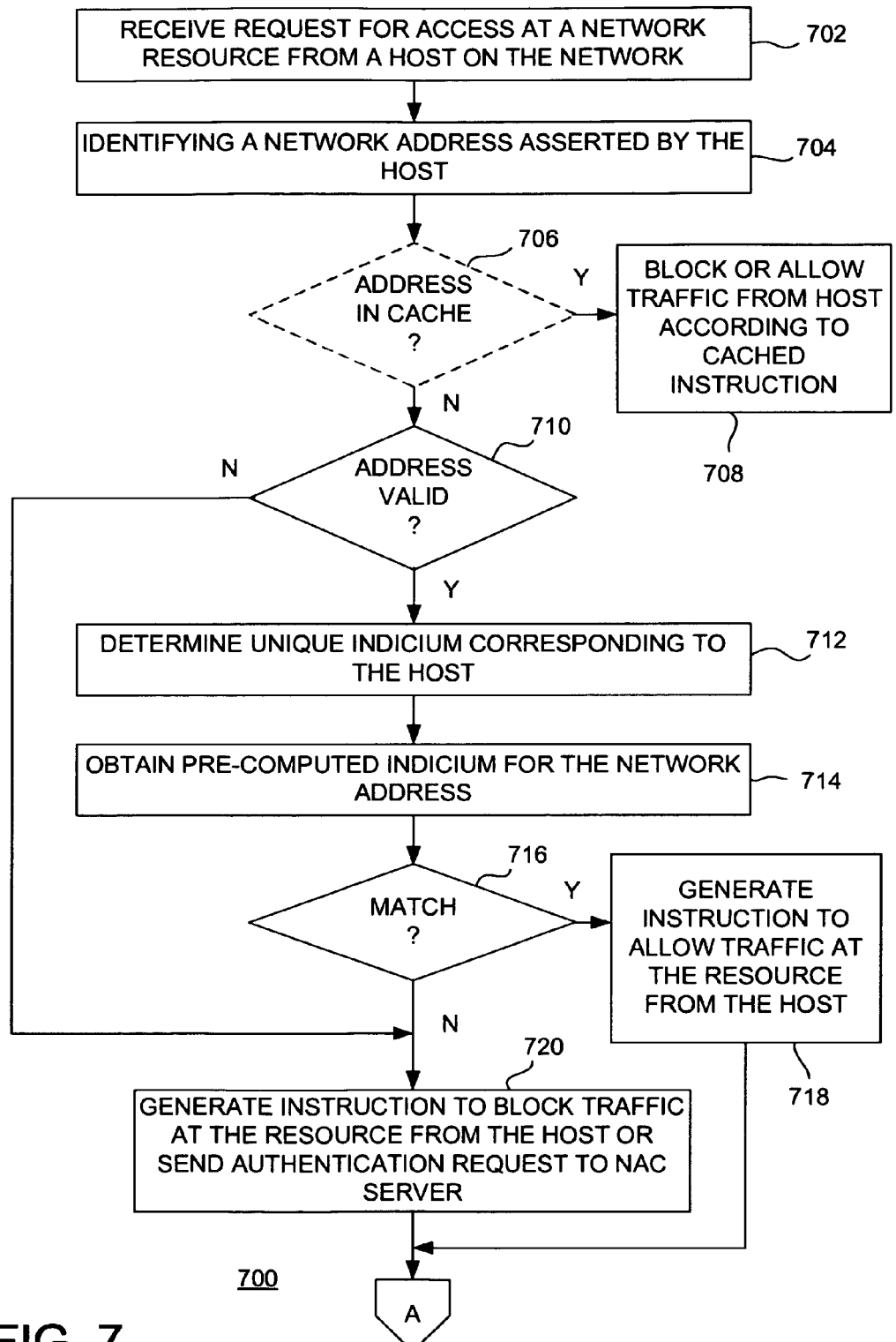
FIGS. 7 and 8 depict a flow diagram of another exemplary embodiment of a method for authenticating a host at a managed network resource in accordance with one or more aspects of the invention.
Figure 8:
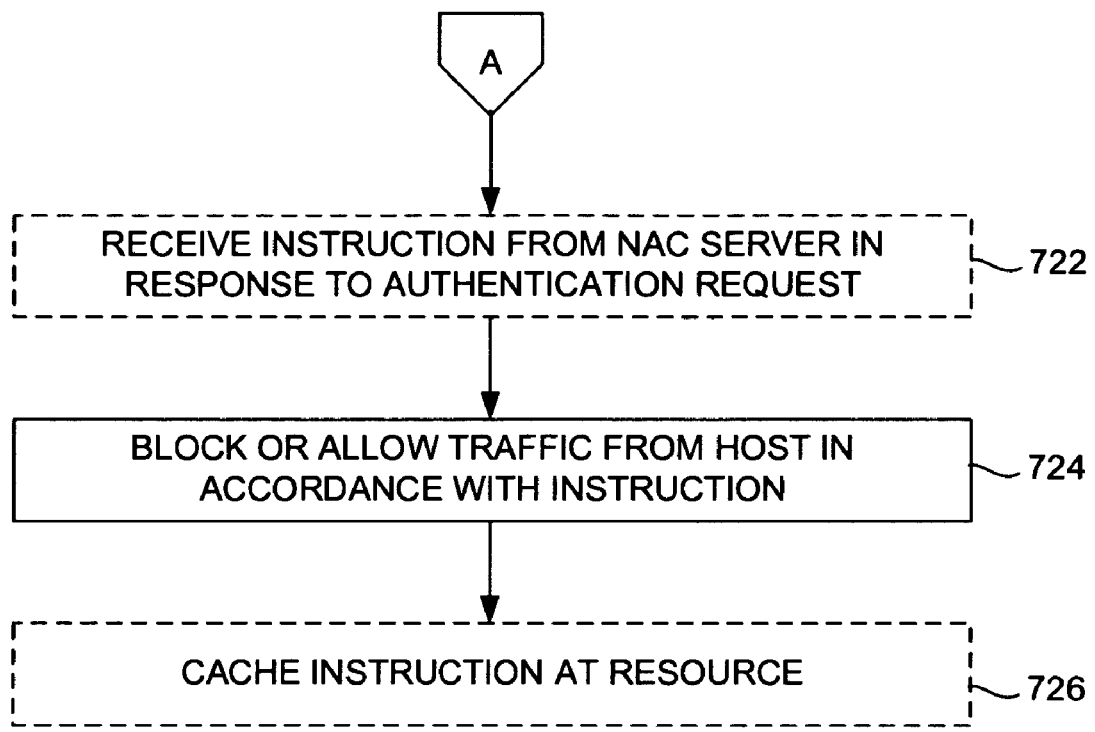

FIGS. 7 and 8 depict a flow diagram of another exemplary embodiment of a method 700 for authenticating a host at a managed network resource in accordance with one or more aspects of the invention. The method 700 may be performed by one of the hosts 108 or 110 (i.e., the resource being accessed by a host). The method 700 begins at step 702, where a request for access by the host is received at the resource. At step 704, a network address asserted by the host is identified. At optional step 706, a determination may be made whether the asserted network address is in an instruction cache of the resource. If so, the method 700 proceeds to step 708, where traffic is blocked or allowed according to the cached instruction. If at optional step 706 the asserted network address is not in the instruction cache, the method 700 proceeds to step 710.

As described above, the resource may store a replica of the table 208 maintained by the NAC server 104. Thus, at step 710, a determination is made at the resource whether the asserted address is valid. If so, the method 700 proceeds to step 712; otherwise, the method 700 proceeds to step 720. At step 712, a unique indicium corresponding to the host is determined. At step 714, a pre-computed indicium for the network address is obtained.

At step 716, a determination is made whether the unique indicium of the host matches the pre-computed unique indicium for the asserted network address. If not, the method 700 proceeds to step 720; otherwise, the method 700 proceeds to step 718. At step 718, an instruction to allow traffic at the resource form the host is generated. At step 720, an instruction to block traffic at the resource from the host is generated or, alternatively, an authentication request is sent from the resource to the NAC server 104. If an authentication request is sent from the resource to the NAC server 104, the method 700 proceeds to optional step 722, where an instruction is received from the NAC server 104 in response to the authentication request. The instruction may be generated at the NAC server 104 in accordance with steps 506 through 516 of the method 500 in FIG. 5. At step 724, traffic from the host is blocked or allowed at the resource in accordance with the instruction. At optional step 726, the instruction is cached at the resource.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method of authenticating a host requesting access to a resource managed by a network access control (NAC) server on a network, comprising:
   identifying a network address asserted by the host;
   determining whether the network address is valid;
   if the network address is valid:
       determining unique indicium uniquely identifying the host, wherein the unique indicium is a hash value computed from the network address and at least one of an operating system version, an operating system serial number, or one or more serial numbers or versions of software present on the host;
       obtaining pre-computed indicium for the network address;
       comparing the unique indicium and the pre-computed indicium;
       generating an instruction to block traffic at the resource from the host if the unique indicium does not match the pre-computed indicium or allow traffic at the resource from the host if the unique indicium matches the pre-computed indicium; and
       caching the instruction to block traffic or allow traffic at the resource for the network address asserted by the host;
   wherein the step of determining whether the network address is valid comprises receiving a table with the network address at the resource from the NAC server.

2. The method of claim 1, wherein the step of determining whether the network address is valid comprises:
   querying the table with the network address; and
   designating the network address as invalid if the network address is not included in the table and valid if the network address is in the table; and
   wherein the instruction to block traffic at the resource from the host is further generated if the network address is invalid.

3. The method of claim 2, wherein the table includes network addresses and pre-computed indicia corresponding to hosts assigned the network addresses, each of the network addresses being static or leased from a dynamic host configuration protocol (DHCP) server on the network, and wherein the step of obtaining further comprises:
   querying the table using the network address to obtain the pre-computed indicium.

4. The method of claim 3, further comprising:
   receiving an authentication request from the resource at the NAC server, the authentication request including the network address of the host;
   performing the steps of determining whether the network address is valid, determining the unique indicium corresponding to the host, obtaining the pre-computed indicium for the network address, comparing the unique indicium and the pre-computed indicium at the NAC server, and generating the instruction; and
   sending the instruction from the NAC server to the resource.

5. The method of claim 3, wherein the table further includes a list of flagged static network addresses, and wherein the step of determining whether the network address is valid further comprises:
   designating the network address as invalid if the network address is included in the list of flagged static network addresses.

6. The method of claim 1, wherein the instruction to block traffic or allow traffic is cached for a variable length of time based on a function of work hours and non-work hours.

7. Apparatus for authenticating a host requesting access to a resource managed by a network access control (NAC) server on a network, comprising:
   means for identifying a network address asserted by the host;
   means for determining whether the network address is valid;
   means for determining unique indicium uniquely identifying the host, wherein the unique indicium is a hash value computed from the network address and at least one of an operating system version, an operating system serial number, or one or more serial numbers or versions of software present on the host;
   means for obtaining pre-computed indicium for the network address;
   means for comparing the unique indicium and the pre-computed indicium;
   means for generating an instruction to block traffic at the resource from the host if the unique indicium does not match the pre-computed indicium or allow traffic at the resource from the host if the unique indicium matches the pre-computed indicium; and
   means for caching the instruction to block traffic or allow traffic at the resource for the network address asserted by the host;
   wherein the means for determining whether the network address is valid comprises means for receiving a table with the network address at the resource from the NAC server.

8. The apparatus of claim 7, wherein the means for determining whether the network address is valid comprises:
   means for querying the table with the network address; and
   means for designating the network address as invalid if the network address is not included in the table and valid if the network address is in the table.

9. The apparatus of claim 8, wherein the table includes network addresses and pre-computed indicia corresponding to hosts assigned the network addresses, each of the network addresses being static or leased from a dynamic host configuration protocol (DHCP) server on the network, and wherein the means for obtaining further comprises:
   means for querying the table using the network address to obtain the pre-computed indicium.

10. The apparatus of claim 9, wherein the table further includes a list of flagged static network addresses, and wherein the means for determining whether the network address is valid further comprises:
    means for designating the network address as invalid if the network address is included in the list of flagged static network addresses.

11. The apparatus of claim 7, wherein the instruction to block traffic or allow traffic is cached for a variable length of time based on a function of work hours and non-work hours.

12. A system for authenticating a host requesting access to a resource on a network, comprising:
    a host computer including a network security agent configured to send an authentication request having a network address asserted by the host; and
    a server computer including a network access control (NAC) server configured to determining whether the network address is valid and, if the network address is valid:
        determine unique indicium uniquely identifying the host wherein the unique indicium is a hash value computed from the network address and at least one of an operating system version, an operating system serial number, or one or more serial numbers or versions of software present on the host;
        obtain pre-computed indicium for the network address;
        compare the unique indicium and the pre-computed indicium; and
        generate an instruction to block traffic at the resource from the host if the unique indicium does not match the pre-computed indicium or allow traffic at the resource from the host if the unique indicium matches the pre-computed indicium;
        a cache configured to store the instruction to block traffic or allow traffic at the resource for the network address asserted by the host;
    wherein the NAC server is configured to send the instruction to the network security agent, and wherein the network security agent is configured to block or allow traffic at the resource from the host according to the instruction.

13. The system of claim 12, wherein the instruction to block traffic or allow traffic is cached for a variable length of time based on a function of work hours and non-work hours.

14. The system of claim 12, further comprising:
    a dynamic host configuration protocol (DHCP) server configured to lease network addresses;
    wherein the NAC server is further configured to receive a network address request from the network security agent, determine whether the resource is compliant with a security policy, generate the pre-computed indicium, pass the network address request to the DHCP server, and record a network address leased to the resource by the DHCP server with the pre-computed indicium in a table.

15. The system of claim 14, wherein the table includes network addresses and pre-computed indicia corresponding to hosts assigned the network addresses, each of the network addresses being static or leased from the dynamic DHCP server on the network.

16. The system of claim 15, wherein the table further includes a list of flagged static network addresses, and wherein the NAC server is configured to designate the network address as invalid if the network address is included in the list of flagged static network addresses.

17. A non-transitory computer readable medium having instructions stored thereon that when executed by a processor cause the processor to perform a method of authenticating a host requesting access to a resource managed by a network access control (NAC) server on a network, comprising:
    identifying a network address asserted by the host;
    determining whether the network address is valid;
    if the network address is valid:
        determining unique indicium uniquely identifying the host wherein the unique indicium is a hash value computed from the network address and at least one of an operating system version, an operating system serial number, or one or more serial numbers or versions of software present on the host;
        obtaining pre-computed indicium for the network address;
        comparing the unique indicium and the pre-computed indicium;
        generating an instruction to block traffic at the resource from the host if the unique indicium does not match the pre-computed indicium or allow traffic at the resource from the host if the unique indicium matches the pre-computed indicium; and
        caching the instruction to block traffic or allow traffic at the resource for the network address asserted by the host;
    wherein the step of determining whether the network address is valid comprises:
        querying a table with the network address; and
        receiving the table at the resource from the NAC server.

18. The non-transitory computer readable medium of claim 17, wherein the step of determining whether the network address is valid comprises:
    designating the network address as invalid if the network address is not included in the table and valid if the network address is in the table; and
    wherein the instruction to block traffic at the resource from the host is further generated if the network address is invalid; and
    wherein the table includes network addresses and pre-computed indicia corresponding to hosts assigned the network addresses, each of the network addresses being static or leased from a dynamic host configuration protocol (DHCP) server on the network.

* * * * *